(12) United States Patent
Tu et al.

(10) Patent No.: US 12,444,168 B2
(45) Date of Patent: Oct. 14, 2025

(54) SYSTEMS AND METHODS FOR OBJECT DETECTION USING IMAGE TILING

(71) Applicant: Google LLC, Mountain View, CA (US)

(72) Inventors: Jilin Tu, Santa Clara, CA (US); Jiang Wang, Santa Clara, CA (US); Huizhong Chen, Mountain View, CA (US); Xiangxin Zhu, Sunnyvale, CA (US); Shengyang Dai, Dublin, CA (US)

(73) Assignee: GOOGLE LLC, Mountain View, CA (US)

( * ) Notice: Subject to any disclaimer, the term of this patent is extended or adjusted under 35 U.S.C. 154(b) by 765 days.

(21) Appl. No.: 17/622,462

(22) PCT Filed: Aug. 5, 2019

(86) PCT No.: PCT/US2019/045089
§ 371 (c)(1),
(2) Date: Dec. 23, 2021

(87) PCT Pub. No.: WO2021/025677
PCT Pub. Date: Feb. 11, 2021

(65) Prior Publication Data
US 2022/0254137 A1  Aug. 11, 2022

(51) Int. Cl.
*G06V 10/778*    (2022.01)
*G06V 10/764*    (2022.01)
*G06V 10/75*     (2022.01)

(52) U.S. Cl.
CPC ......... *G06V 10/765* (2022.01); *G06V 10/778* (2022.01); *G06V 10/759* (2022.01)

(58) Field of Classification Search
CPC .. G06V 10/765; G06V 10/778; G06V 10/759; G06V 10/751; G06V 10/74;
(Continued)

(56) References Cited

U.S. PATENT DOCUMENTS 10,242,482 B2 *  3/2019  Yang ..................... G06T 11/40
11,645,834 B2    5/2023  Han et al.
(Continued)

FOREIGN PATENT DOCUMENTS

CN    108537182 A  *  9/2018  ......... G06K 9/00657

OTHER PUBLICATIONS

Plastiras et al. "Efficient convnet-based object detection for unmanned aerial vehicles by selective tile processing"; Proceedings of the 12th international conference on distributed smart cameras; (Year: 2018).*
(Continued)

*Primary Examiner* — Sumati Lefkowitz
*Assistant Examiner* — Michael Adam Shariff
(74) *Attorney, Agent, or Firm* — DORITY & MANNING P.A.

(57) ABSTRACT

A computing system for detecting objects in an image can perform operations including generating an image pyramid that includes a first level corresponding with the image at a first resolution and a second level corresponding with the image at a second resolution. The operations can include tiling the first level and the second level by dividing the first level into a first plurality of tiles and the second level into a second plurality of tiles; inputting the first plurality of tiles and the second plurality of tiles into a machine-learned object detection model; receiving, as an output of the machine-learned object detection model, object detection data that includes bounding boxes respectively defined with respect to individual ones of the first plurality of tiles and the second plurality of tiles; and generating image object detection output by mapping the object detection data onto an image space of the image.

16 Claims, 14 Drawing Sheets

(58) Field of Classification Search
CPC ........ G06V 10/70; G06V 10/82; G06V 10/02;
G06T 2207/20021; G06T 7/11; G06T
2207/20016; G06T 2207/20081; G06T
2207/20084; G06T 2210/12; G06N 3/02;
G06N 3/044; G06N 3/0442; G06N 3/045;
G06N 3/091; G06N 3/08; G06N 20/00;
G06N 3/0464; G06N 3/04; G06F 18/214
See application file for complete search history.

(56) References Cited

U.S. PATENT DOCUMENTS

| | | | |
|---|---|---|---|
| 2017/0039457 A1* | 2/2017 | Yu | G06N 3/02 |
| 2017/0124415 A1* | 5/2017 | Choi | G06T 7/73 |
| 2019/0139216 A1* | 5/2019 | Georgescu | G06N 3/048 |
| 2019/0171912 A1 | 6/2019 | Gonzalez et al. | |

OTHER PUBLICATIONS

International Preliminary Report on Patentability for Application No. PCT/US2019/045089, mailed Feb. 17, 2022, 12 pages.
Plastiras et al., "Efficient ConvNet-based Object Detection for Unmanned Aerial Vehicles by Selective Tile Processing", arXiv:1911.06073v1, 6 pages.
Ren et al., "Faster R-CNN: Towards Real-Time Object Detection with Region Proposal Networks", arXiv: 1506.01497v3, 14 pages.
Singh et al., "An Analysis of Scale Invariance in Object Detection—SNIP", arXiv:1711.08189v2, 10 pages.
Chinese Search Report Corresponding to Application No. 2019800981412 on Dec. 27, 2024.

* cited by examiner

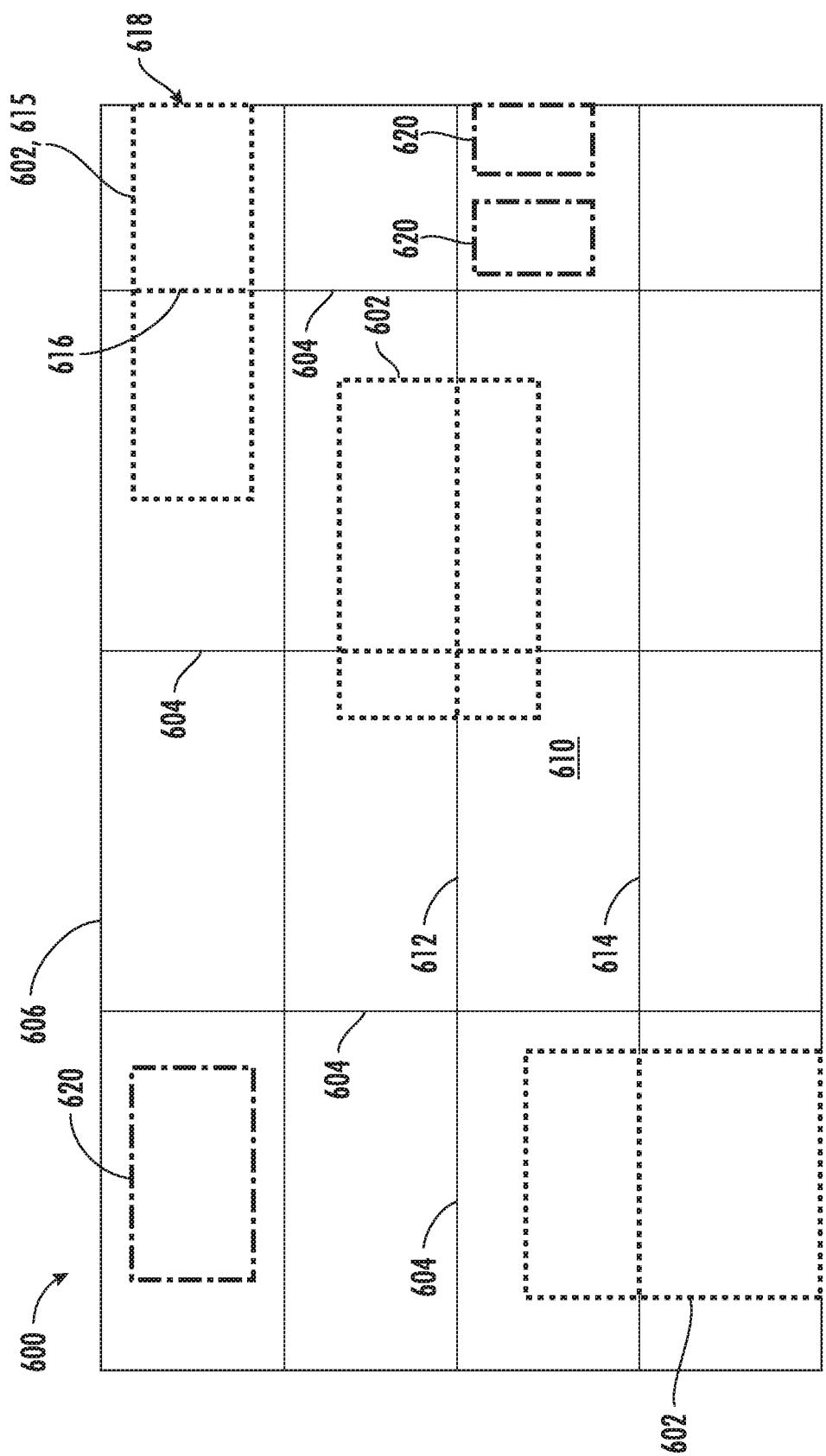

SYSTEMS AND METHODS FOR OBJECT DETECTION USING IMAGE TILING

PRIORITY CLAIM

This application is based upon and claims the right of priority under 35 U.S.C. § 371 to International Application No. PCT/US2019/045089 filed on Aug. 5, 2019. Applicant claims priority to and the benefit of each of this application and incorporates all such applications herein by reference in its entirety.

FIELD

The present disclosure relates generally to machine-learning. More particularly, the present disclosure relates to systems and methods for object detection using image tiling.

BACKGROUND

Machine-learned models can be trained to detect objects within images. Detecting both small and large objects within the same image, however, can be difficult for such machine-learned models. More specifically, small objects are often missed or misidentified by machine-learned models that have not been trained to recognize such small objects. Accordingly, improved machine-learned object detection and/or recognition models and methods for training the same would be welcomed in the art.

SUMMARY

Aspects and advantages of embodiments of the present disclosure will be set forth in part in the following description, or can be learned from the description, or can be learned through practice of the embodiments.

One aspect of the present disclosure is directed to a computing system comprising at least one processor and a machine-learned object detection model configured to receive a plurality of tiles, and, in response to receipt of the plurality of tiles, output object detection data for the plurality of tiles. The object detection data can include a plurality of bounding boxes respectively defined with respect to individual ones of the plurality of tiles. The computing system can include at least one tangible, non-transitory computer-readable medium that stores instructions that, when executed by the at least one processor, cause the at least one processor to perform operations. The operations can include generating an image pyramid based on an image having an image space. The image pyramid can include a first level corresponding with the image at a first resolution and a second level corresponding with the image at a second resolution that is different than the first resolution. The operations can include tiling the first level and the second level by dividing the first level into a first plurality of tiles and the second level into a second plurality of tiles; inputting the first plurality of tiles and the second plurality of tiles into the machine-learned object detection model; receiving, as an output of the machine-learned object detection model, the object detection data comprising the plurality of bounding boxes respectively defined with respect to individual ones of the first plurality of tiles and the second plurality of tiles; and generating an image object detection output by mapping the object detection data onto the image space of the image.

Another aspect of the present disclosure is directed to a method for training a machine learned object detection model. The method can include, for each training image of a plurality of training images, performing a series of steps, including generating, by one or more computing devices, an image pyramid based on the respective training image having a respective image space, the image pyramid comprising a first level corresponding with the respective training image at a first resolution and a second level corresponding with the respective training image at a second resolution that is different than the first resolution. The steps can include tiling, by the one or more computing devices, the first level and the second level by dividing the first level into a first plurality of tiles and the second level into a second plurality of tiles; inputting, by the one or more computing devices, the first plurality of tiles and the second plurality of tiles into a machine-learned object detection model; receiving, by the one or more computing devices and as an output of the machine-learned object detection model, object detection data comprising the plurality of bounding boxes respectively defined with respect to individual ones of the first plurality of tiles and the second plurality of tiles; generating, by the one or more computing devices, an image object detection output by mapping the object detection data onto the respective image space of the respective training image; and adjusting, by the one or more computing devices, parameters of the machine-learned object detection model based on a comparison of the image object detection output with ground truth object location data that corresponds to the respective training image of the plurality of training images.

Another aspect of the present disclosure is directed to a method for detecting locations of objects in images. The method can include generating, by one or more computing devices, an image pyramid based on an image having an image space. The image pyramid can include a first level corresponding with the image at a first resolution and a second level corresponding with the image at a second resolution that is different than the first resolution. The method can include tiling, by the one or more computing devices, the first level and the second level by dividing the first level into a first plurality of tiles and the second level into a second plurality of tiles; inputting, by the one or more computing devices, the first plurality of tiles and the second plurality of tiles into the machine-learned object detection model; receiving, by the one or more computing devices and as an output of the machine-learned object detection model, the object detection data comprising the plurality of bounding boxes respectively defined with respect to individual ones of the first plurality of tiles and the second plurality of tiles; and generating, by the one or more computing devices, an image object detection output by mapping the object detection data onto the image space of the image.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts a simplified level of an image pyramid including a plurality of bounding boxes according to example embodiments of the present disclosure

Figure 1A:
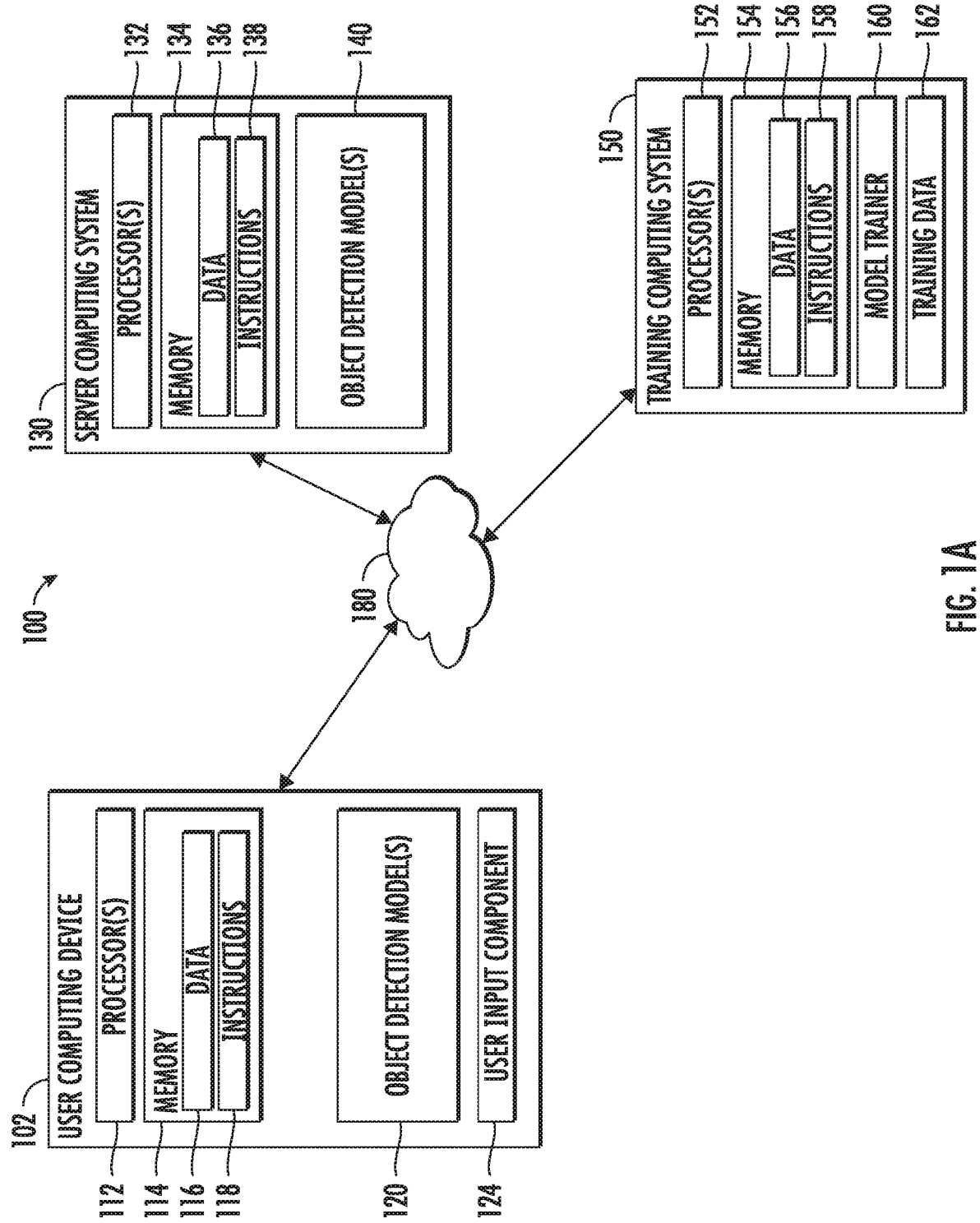
FIG. 1A depicts a block diagram of an example computing system for detecting locations of objects in images according to example embodiments of the present disclosure.

Reference numerals that are repeated across plural figures are intended to identify the same features in various implementations.

DETAILED DESCRIPTION

Overview

Generally, the present disclosure is directed to systems and methods for detecting locations of objects in images and training models to do the same. Locations of very small and very large objects can both be detected in the same image using implementations disclosed herein. For instance, an image pyramid that includes two or more levels can be generated based on the image. The levels of the image pyramid can correspond with the image at different resolutions. The levels can be divided into tiles (e.g., "tiled"), and object detection can be performed for each of the tiles using a machine-learned model to produce object detection data with respect to each tile. Small objects that are depicted in the image can be better detected by performing object detection for each of the tiles. The object detection data can include bounding boxes (or other data) describing the locations of objects displayed in the respective tiles of the multiple levels of the image pyramid. The object detection data can be mapped onto an image space of the image to generate an image object detection output. As such, bounding boxes identifying locations of small objects in the image can be mapped back to the image space such that the image object detection output identifies such locations of small objects.

As indicated above, the image pyramid can be generated based on the image. The image pyramid can include a first level corresponding with the image at a first resolution and a second level corresponding with the image at a second resolution that is different than the first resolution. The first level and the second level can each be tiled by dividing the first level into a first plurality of tiles and the second level into a second plurality of tiles.

In some implementations, the first plurality of tiles can overlap with respect to the second plurality of tiles such that each object depicted in the image is located entirely within at least one of the tiles. Additionally, tiles within a given layer of the image pyramid (e.g., within the first plurality of tiles) can overlap with adjacent tiles within the same given layer. This can ensure that pruning bounding boxes as described above does not undesirably remove all bounding boxes corresponding with a particular image. In one example, each of the first plurality of tiles can overlap with at least two of the second plurality of tiles. For instance, each of the first plurality of tiles can overlap by 50% with adjacent tiles in the first plurality of tiles (within the same image pyramid layer) and/or the second plurality of tiles (within a distinct image pyramid layer).

A machine-learned object detection model can be used to detect objects within the various tiles. More specifically, the first plurality of tiles and the second plurality of tiles can be input into the machine-learned object detection model. Object detection data can be received as an output of the machine-learned object detection model that includes a plurality of bounding boxes respectively defined with respect to individual ones of the first plurality of tiles and the second plurality of tiles. Thus, the machine-learned object detection model can be used to generate the bounding boxes that identify locations of objects within the various tiles.

As indicated above, the object detection data can be mapped onto the image space of the image to generate an image object detection output that describes the locations of detected objects in the image. In other words, the bounding boxes identifying objects located within the various tiles can be mapped back to the image space such that they identify objects located within the image.

In some implementations, the image object detection output can be "pruned" to improve the quality of the image object detection output. Bounding boxes of the image object detection output can be selected or "pruned" from the object detection data to generate the image object detection output. More specifically, bounding boxes that intersect one or more borders of the tiles can be identified and removed. Removing such bounding boxes can improve the quality of the image object detection output by reducing and/or removing partial and/or duplicate detections. As used herein, "intersect" can refer to a boundary of the bounding box being within a threshold distance of the border of the tile. For example, boundary of a bounding box can be considered as "intersecting" the border of the tile if the bounding box is within a threshold value, K, pixels of the tile border, where K can equal 2 or less. However, in some embodiments the threshold value can equal 4 or less and in some embodiments 10 or less.

As one example, bounding boxes can be removed that intersect one or more borders of the tile within which the bounding box is defined. Intersecting the borders can be indicative of the bounding box corresponding with a "partial" detection in which the detected object spans across multiple tiles at the respective level of the image pyramid. In other words, such intersections can indicate that the detected object is not entirely contained within the bounding box. By removing these bounding boxes, partial detections can be removed from the image object detection output, thereby improving the quality of the image object detection output.

As another example, bounding boxes can be identified and removed that span across the respective tile within which the bounding box is defined such that the bounding box intersects both the (first) border and a (second) opposite border of the respective tile that is parallel with the (first) border. This arrangement can indicate that the detected object extends outside the tile.

As yet another example, the bounding boxes can be identified and removed that intersect both a border of the tile within which the bounding box is defined and an edge of the respective level of the image pyramid.

In some implementations, each bounding box that intersects a border of a tile within which it is defined can be identified and removed. As a result, the image object detection output can be free of bounding boxes that intersects any border of the respective tiles within which they are defined. As a result, bounding boxes corresponding with partial detections can be removed such that only bounding boxes corresponding with complete detections remain.

In some implementations, bounding boxes that are redundant or duplicative can be removed from the image object detection output. Bounding boxes having low detection scores or confidences can be removed, for example using non-maximal suppression, or a variant thereof.

In some implementations, preliminary processing of the image may be conducted to generate one or more intermediate feature representations, which can be used to generate the image pyramid. For example, the intermediate feature representations can be generated using a preliminary machine-learned object detection model. The image pyramid can then be generated based on the intermediate feature representations. More specifically, the image can be tiled into a plurality of preliminary tiles. The plurality of preliminary tiles can be input to the preliminary machine-learned object detection model and a plurality of intermediate feature representations that respectively correspond with the plurality of preliminary tiles can be received as an output of the preliminary machine-learned object detection model. The levels of the image pyramid can be generated based on the plurality of intermediate feature representations.

For example, the preliminary tiles can correspond with a preliminary image pyramid having a plurality of levels. One level of the preliminary image pyramid can be used to generate multiple levels of the image pyramid. More specifically, a respective level of the preliminary image pyramid can be downsized to different resolutions that respectively correspond multiple levels of the image pyramid. The remaining steps of the method can be performed on the image pyramid to detect objects depicted in the image as described herein. Generating the intermediate feature representations as described herein can reduce the computational resources required to identify objects in the image.

Aspects of the present disclosure are also directed to methods for training one more machine learned models for detecting locations of objects in images. For example, the method can include performing the following steps for each training image of a plurality of training images: generating an image pyramid based on the respective training image of the plurality of training images, tiling levels of the image pyramid, inputting the plurality of tiles into a machine-learned object detection model, receiving object detection data as an output of the machine-learned object detection model, and generating image object detection output by mapping the object detection data on an image space of the image for example as described above. The method for training the machine-learned model can include adjusting parameters of the machine-learned object detection model based on a comparison of the image object detection output with ground truth object location data corresponding to the respective training image of the plurality of training images. The ground truth object location data can describe locations of objects in a set of ground truth images.

In some implementations, re-weighing and/or resampling can be used to re-balance the distribution of size and/or classes of detected objects in training data. When tiling training images, small objects may become more dominant a resulting tiled training set. Additionally, classes of objects that are generally small can become dominant for the same reasons. Thus, re-weighing and/or re-sampling the training data can be used to correct such dominance of small objects.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

The systems and methods of the present disclosure provide a number of technical effects and benefits. More specifically, detection of small objects in large images can be improved. Additionally, "pruning" bounding boxes can improve the quality of object recognition data by removing bounding boxes corresponding with partial detections of objects spanning multiple tiles. The improved object recognition data can be more accurate, require less space to store, and/or require fewer computational resources for subsequent processing. Further, use of a preliminary model and preliminary tiles, as described above, can reduce the computational resources (e.g., storage space, processing power, number of flops, size of random access memory, etc.) required to identify objects in images.

With reference now to the Figures, example embodiments of the present disclosure will be discussed in further detail.

Example Devices and Systems

FIG. 1A depicts a block diagram of an example computing system 100 for detecting locations of objects in images and training models to do the same according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned object detection models 120. For example, the machine-learned object detection models 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example machine-learned object detection models 120 are discussed with reference to FIGS. 2A and 2B.

In some implementations, the one or more machine-learned object detection models 120 can be received from the server computing system 130 over network 180, stored in the user computing device memory 114, and the used or otherwise implemented by the one or more processors 112. In some implementations, the user computing device 102 can implement multiple parallel instances of a single machine-learned object detection model 120 (e.g., to perform parallel object detection across multiple instances of the models 120).

Additionally or alternatively, one or more machine-learned object detection models 140 can be included in or otherwise stored and implemented by the server computing system 130 that communicates with the user computing device 102 according to a client-server relationship. For example, the machine-learned object detection models 140 can be implemented by the server computing system 130 as a portion of a web service (e.g., an image processing service). Thus, one or more object-detection models 120 can be stored and implemented at the user computing device 102 and/or one or more object-detection models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned object-detection models 140. For example, the models 140 can be or can otherwise include various machine-learned models such as neural networks (e.g., deep recurrent neural networks) or other multi-layer non-linear models. Example models 140 are discussed with reference to FIGS. 2A and 2B.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that can train the machine-learned models 140 stored at the server computing system 130, for example as described below with reference to FIG. 8 (e.g., using various training or learning techniques, such as, for example, backwards propagation of errors). In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train an object-detection model 140 based on a set of training data 142. The training data 142 can include a set of training images and/or ground truth object location data that describes locations of objects in the set of ground truth images.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
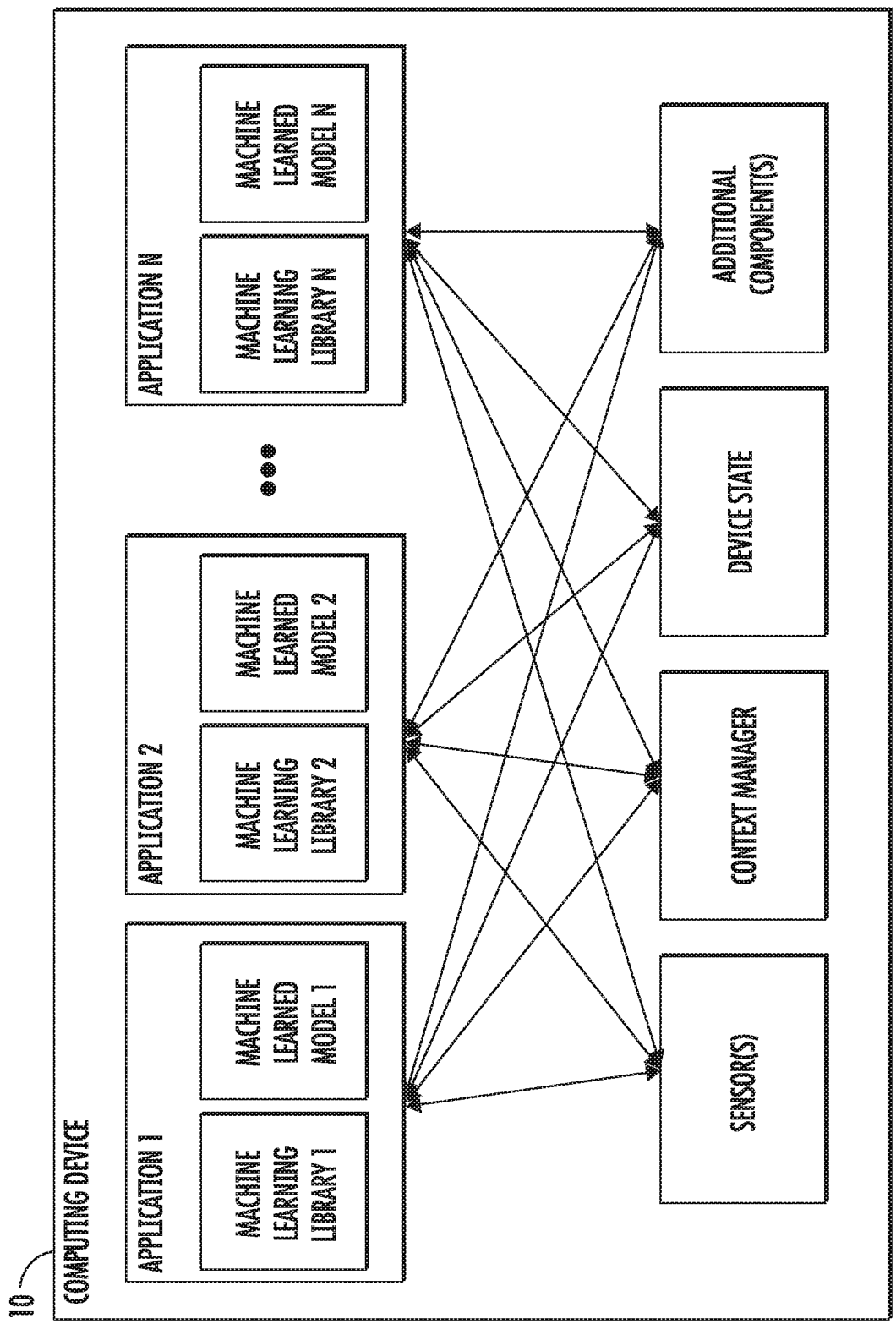
FIG. 1B depicts a block diagram an example computing system for detecting locations of objects in images according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
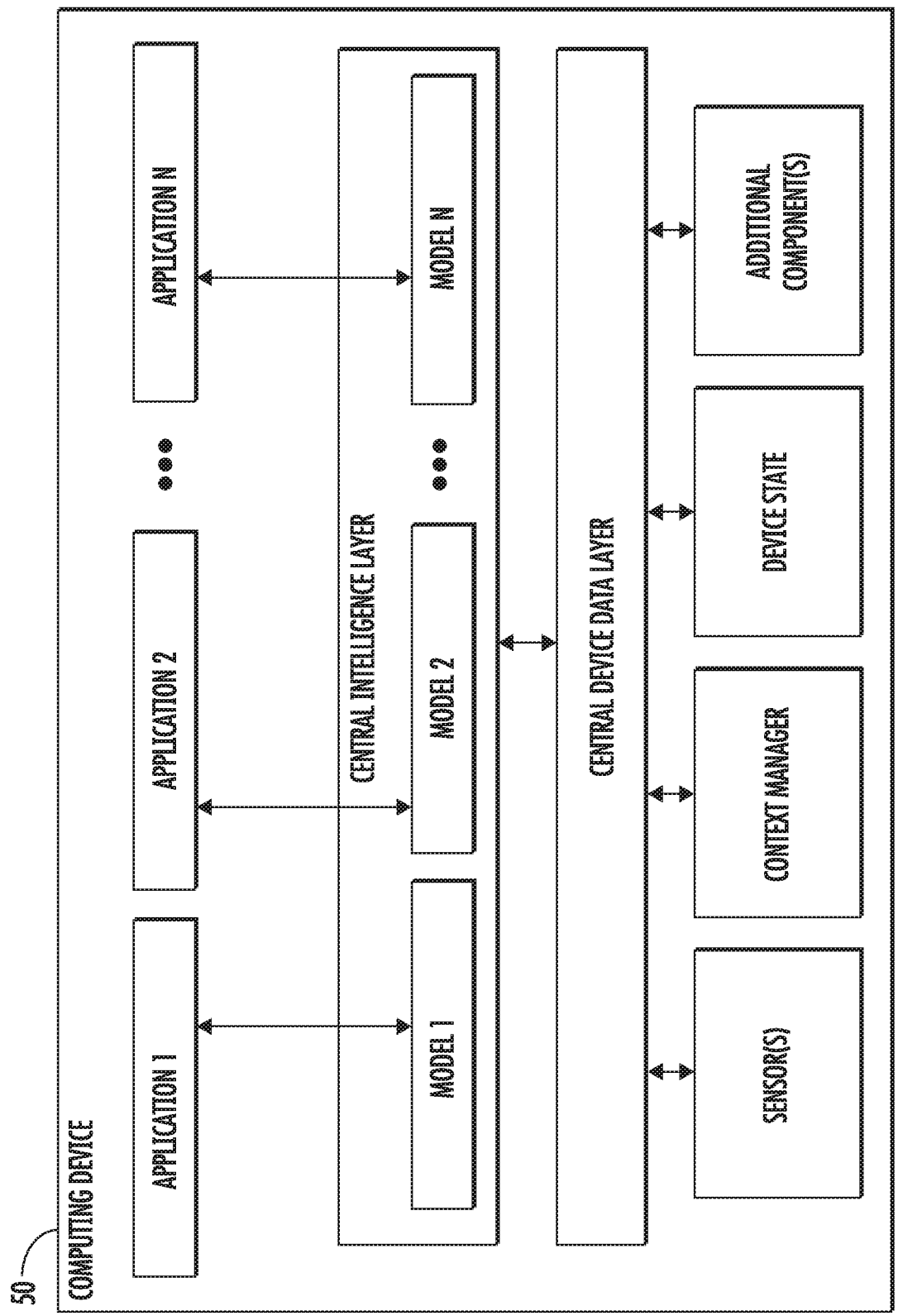
FIG. 1C depicts a block diagram of an example computing system for generating and providing suggested actions to users of computing systems according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2A:
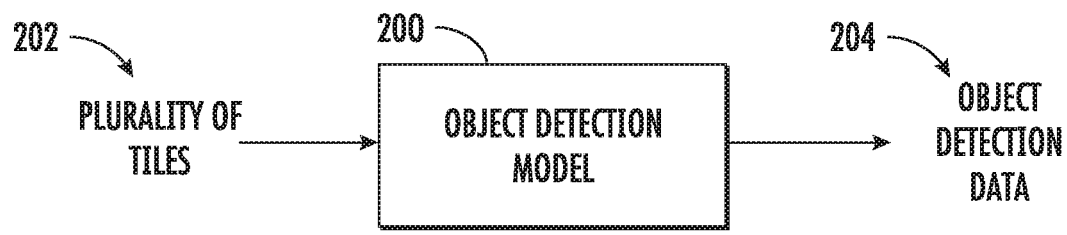
FIG. 2A depicts a block diagram of an example machine-learned object detection model according to example embodiments of the present disclosure.

FIG. 2A depicts a block diagram of an example machine-learned object detection model 200 according to example embodiments of the present disclosure. In some implementations, the machine-learned object detection model 200 is trained to receive a plurality of tiles 202 and, as a result of receipt of the plurality of tiles 202, output object detection data 204. The plurality of tiles 202 can correspond with respective levels of an image pyramid, for example as described below with reference to FIGS. 3 through 8. The object detection data 204 can include bounding boxes (or other data) describing the locations of objects displayed in the respective tiles 202 of the multiple levels of the image pyramid, for example as described below with reference to FIGS. 3 through 8.

Figure 2B:
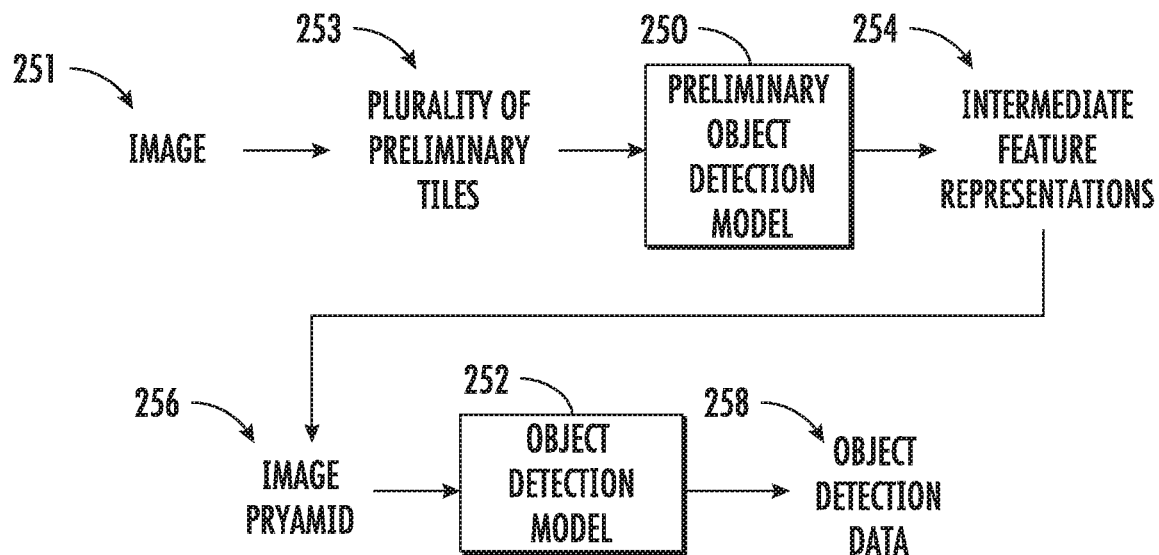
FIG. 2B depicts a block diagram of an example preliminary machine-learned object detection model and a machine-learned object detection model according to example embodiments of the present disclosure.

FIG. 2B depicts a block diagram of an example preliminary machine-learned object detection model 250 and a machine-learned object detection model 252 according to example embodiments of the present disclosure. Preliminary processing of the image may be conducted with the preliminary object detection model 250 to generate one or more intermediate feature representations 254, which can be used to generate the image pyramid 256. More specifically, an image 251 can be tiled into a plurality of preliminary tiles 253. The plurality of preliminary tiles 253 can be input to the preliminary machine-learned object detection model 250. The intermediate feature representations 254 can be received as an output of the preliminary machine-learned object detection model 250 and can respectively correspond with the plurality of preliminary tiles 253.

The levels of the image pyramid 256 can be generated based on the plurality of intermediate feature representations 254. For example, the preliminary tiles 253 can correspond with a preliminary image pyramid having a plurality of levels. One level of the preliminary image pyramid can be used to generate multiple levels of the image pyramid 256. A respective level of the preliminary image pyramid can be downsized to different resolutions that respectively correspond with multiple levels of the image pyramid 256. In some implementations, the preliminary tiles 253 can be non-overlapping (e.g., within a given pyramid layer), and the tiles of the image pyramid 256 can be overlapping (e.g., respective tiles within a given image pyramid layer can overlap adjacent tiles within the same image pyramid layer) such that multiple tiles of the image pyramid 256 can be generated from a single preliminary tile 253.

The levels of the image pyramid 256 can be tiled and input into the object detection model 252, for example as described above with respect to FIG. 2A. Object detection data 258 can be received as an output of the object detection model 252, for example as described above with respect to FIG. 2B.

Example Methods

Figure 3:
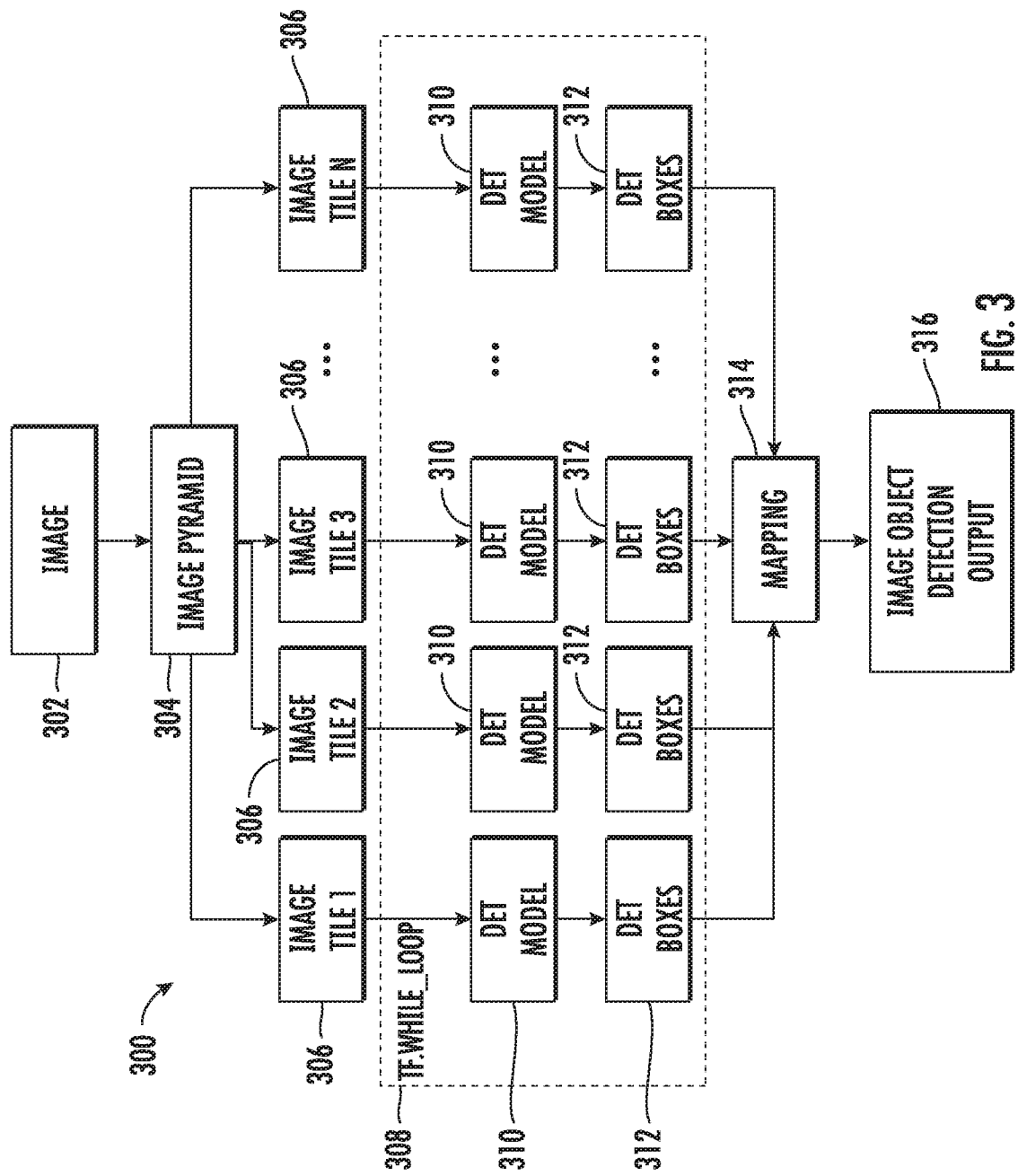
FIG. 3 is a simplified flowchart diagram of a method for detecting locations of objects in images according to example embodiments of the present disclosure.

FIG. 3 is a simplified flowchart diagram of a method 300 for detecting locations of objects in images according to example embodiments of the present disclosure. As indicated above, locations of very small and very large images can both be detected in the same image. An image pyramid 304, also referred to as an "image tensor," can be generated based on an image 302. The levels of the image pyramid can correspond with the image 302 at different resolutions. The levels can be divided into tiles 306 (e.g., "tiled"), and object detection can be performed, at (308), for each of the tiles 306 using one or more machine-learned model(s) 310 to produce object detection data 312 with respect to each tile 306. Small objects that are depicted in the image can be better detected by performing object detection for each of the tiles. The object detection data 312 can include bounding boxes (or other data) describing the locations of objects displayed in the respective tiles 306 of the multiple levels of the image pyramid 304. The object detection data 312 can be mapped, at (314), onto an image space of the image 302 to generate an image object detection output 316.

The bounding boxes of the object detection data 312 can identify locations of objects in the image 302. As object detection was performed on individual tiles 306 of the levels of the image pyramid 304, the locations of small objects in the image 302 can be better detected than performing object detection on the entire image 302.

Figure 4:
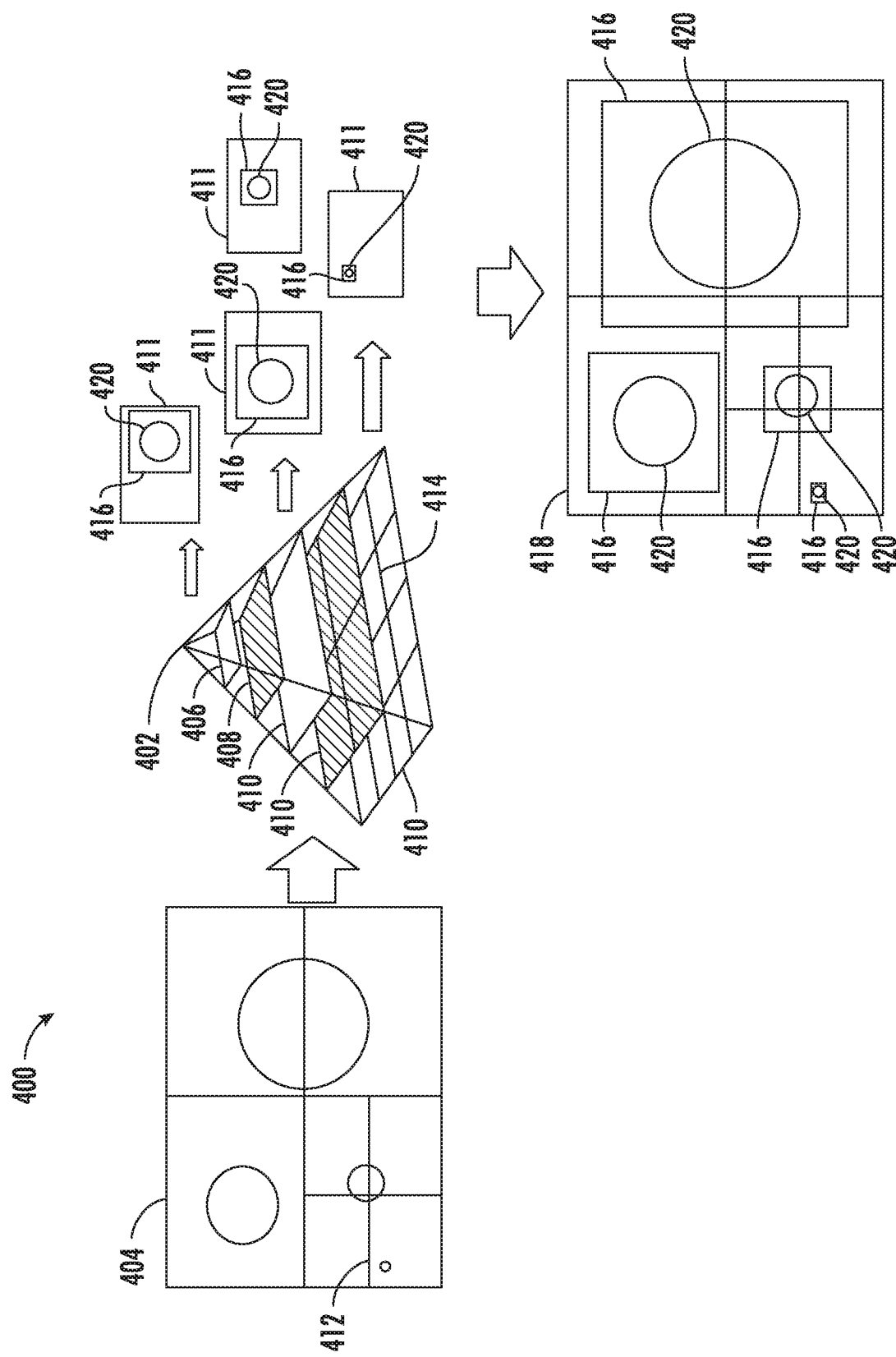
FIG. 4 is a simplified flowchart diagram of a method for detecting locations of objects in images according to example embodiments of the present disclosure.

FIG. 4 is a simplified diagram of a method 400 for detecting locations of objects in images according to example embodiments of the present disclosure. As indicated above, an image pyramid 402 can be generated based on an image 404. The image pyramid 402 can include a first level 406 corresponding with the image 404 at a first resolution and a second level 408 corresponding with the image 404 at a second resolution that is different than the first resolution. The first level 406 and the second level 408 can each be tiled by dividing the first level 406 into a first plurality of tiles and the second level 408 into a second plurality of tiles. The image pyramid 402 can include one or more additional levels 410 corresponding with the image 404 at additional resolutions. The levels 406, 408, 410 can be divided or "tiled" into tiles 411. The tiles 411 are also represented as boxes 412 overlaid over the image 404 and represented as boxes 414 defined in the respective levels 406, 408, 410 of the image pyramid 402. The tiles 411 can be input into a machine-learned object detection model and object detection data that describes the locations of objects detected within the respective tiles can be received as an output of the machine-learned object detection model, for example as described with reference to FIG. 2A. The object detection data can include bounding boxes 416 identifying the locations of objects 420 that were detected in the tiles 411. The object detection data, including the bounding boxes 416, can mapped onto the image space of the image 404 to generate an image object detection output 418 that describes the locations of detected objects 420 in the image 404.

Figure 5A:
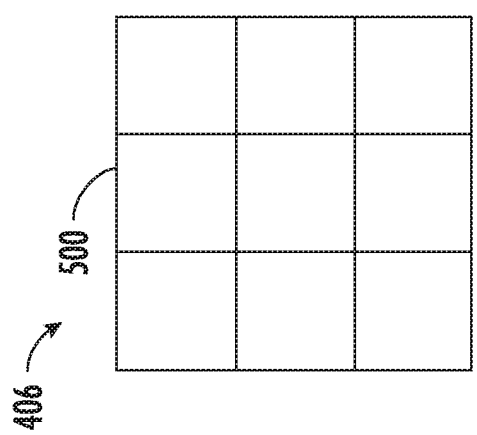
FIG. 5A is a simplified illustration of a first plurality of tiles of a first level of an image pyramid of FIG. 4.
Figure 5B:
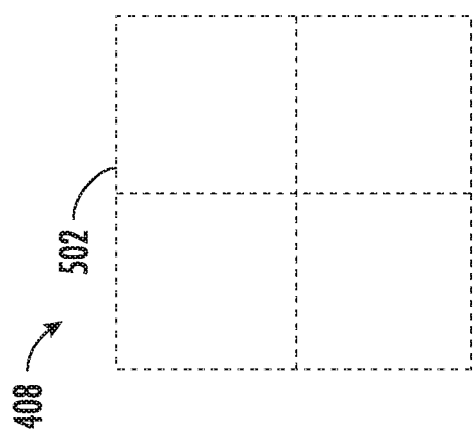
FIG. 5B is a simplified illustration of a second plurality of tiles of a second level of the image pyramid of FIG. 4.
Figure 5C:
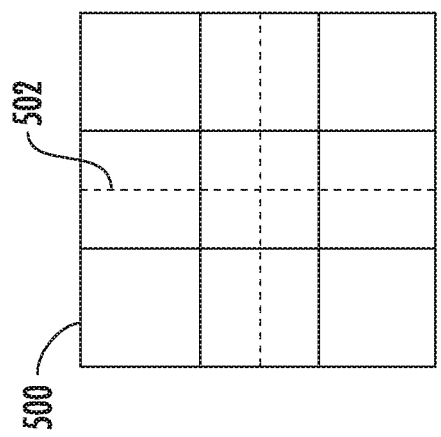
FIG. 5C illustrates the first plurality of tiles of FIG. 5A overlaid over the second plurality of tiles of FIG. 5B.

FIG. 5A is a simplified illustration of a first plurality of tiles 500 of the first level 406 of the image pyramid 402 of FIG. 4. FIG. 5B is a simplified illustration of a second plurality of tiles 502 of the second level 408 of the image pyramid 402 of FIG. 4. FIG. 5C illustrates the first plurality of tiles 500 overlaid over the second plurality of tiles 502. As best seen in FIG. 5C, the first plurality of tiles 500 can overlap with respect to the second plurality of tiles 502 such that each object depicted in the image 404 (FIG. 4) can be located entirely within at least one of the tiles 500, 502. In one example, each of the first plurality of tiles 500 can overlap with at least two of the second plurality of tiles 502. For instance, each of the first plurality of tiles 500 can overlap by at least 50% with adjacent tiles of the second plurality of tiles 502. In some implementations, each of the first plurality of tiles 500 can overlap by 50% with adjacent tiles of the second plurality of tiles 502. Additionally, in some implementations, the respective tiles within a given image pyramid layer can overlap with adjacent tile within the given image pyramid layer. For instance, respective tiles of the first plurality of tiles 500 can overlap with adjunct tiles within the first plurality of tiles 500. As another example, respective tiles of the second plurality of tiles 502 can overlap with adjunct tiles within the second plurality of tiles 502.

FIG. 6 depicts a simplified level 600 of the image pyramid 402 (FIG. 4) including a plurality of bounding boxes 416 according to example embodiments of the present disclosure. In some implementations, the image object detection output can be "pruned" to improve the quality of the image object detection output. Bounding boxes of the image object detection output can be removed or "pruned" from the object detection data to improve the quality of the image object detection output. More specifically, bounding boxes 602 that intersect one or more borders 604 of the tiles 606 can be identified and removed. Removing such bounding boxes 602 can improve the quality of the image object detection output by removing at least some bounding boxes 602 that correspond with partial and/or duplicate detections.

As one example, the bounding boxes 602 can be removed that intersect one or more borders 604 of the tiles 606 within which the bounding box 602 is defined. Intersecting the borders 604 can indicate that the bounding box 602 corresponding with a "partial" detection in which the detected object spans across multiple tiles 606 at the respective level of the image pyramid 402 (FIG. 4). In other words, such intersections can indicate that the detected object is not entirely contained within the bounding box 602.

As yet another example, bounding boxes 615 can be identified and removed that intersect both a border 616 of the tile 610 within which the respective bounding box 614 is defined and an edge 618 of the respective level 600 of the image pyramid. This can indicate that the detected object extends outside the respective tile 610.

In some implementations, all bounding boxes 602 that intersect a border 604 of a tile 606 can be identified and removed. As a result, the image object detection output can be free of bounding boxes 602 that intersects any border of the respective tiles 606 within which they are defined. As a result, all bounding boxes 602 corresponding with partial detections can be removed such that only bounding boxes 620 that correspond with complete detections remain in image object detection output.

In some implementations, bounding boxes that are redundant or duplicative can be removed from the image object detection output. Bounding boxes having low detection scores or confidences can be removed, for example using non-maximal suppression (NMS), or a variant thereof. For example, the following algorithm can be used to apply NMS and/or Soft-NMS, a variant of NMS:

---

```
Input: B = {b_1, ... b_N}, S = {S_1, ... S_N}, N_t
       B is the list of initial detection boxes
       S contain corresponding detection scores
       N_t is the NMS threshold
begin
    D ← { }
    while B # empty do
        m ← argmax S
        M ← b_m
        D ← D ∪ M; B ← B - M
        for b_i in B do
            if iou(M, b_i) ≥ N_t then
                B ← B - b_i; S ← S - s_i
            end
            s_i ← s_i f (iou(M, b_i))
        end
    end
    return D, S
end
```

---

Figure 7:
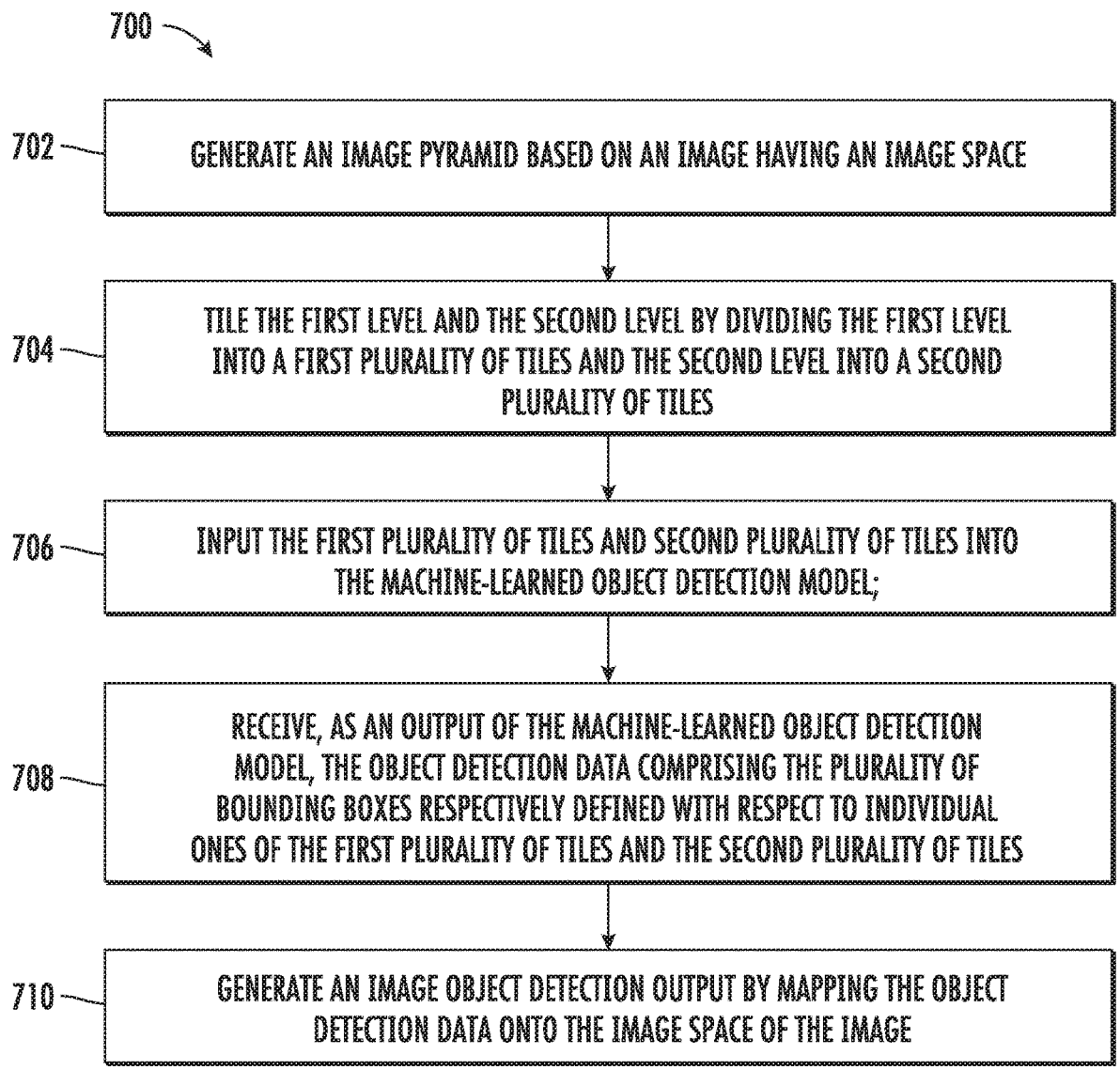
FIG. 7 depicts a flowchart of a method for detecting locations of objects in images according to aspects of the present disclosure.

FIG. 7 depicts a flowchart of an example method 700 for detecting locations of objects in images according to aspects of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can generate an image pyramid based on an image having an image space. The image pyramid can include a first level corresponding with the image at a first resolution and a second level corresponding with the image at a second resolution that is different than the first resolution, for example as described above with reference to FIGS. 3 and 4.

At 704, the computing system can tile the first level and the second level of the image pyramid by dividing the first level into a first plurality of tiles and the second level into a second plurality of tiles, for example as described above with reference to FIGS. 3 and 4. As an example, the first level can be evenly divided into the first plurality of tiles with respect to a height direction of the first level, and/or width direction of the first level. As a result, the plurality of tiles can form a grid such that some or all of the first plurality of tiles have the same size and shape (e.g., rectangular, square, parallelogram, etc.). The second plurality of tiles can have the same size, shape, arrangement, etc. as the first plurality of tiles. However, in some implementations, the size, shape, arrangement, etc. of the tiles can vary from level to level. For instance, the tiles can decrease or increase in size as the resolution of the levels increases. In other implementations, the first and/or second plurality of tiles can be irregularly shaped and/or form other shapes, such as triangular.

At 706, the computing system can input the first plurality of tiles and the second plurality of tiles into the machine-learned object detection model, for example as described above with reference to FIG. 2A.

At 708, the computing system can receive, as an output of the machine-learned object detection model. The object detection data can include a plurality of bounding boxes respectively defined with respect to individual ones of the first plurality of tiles and the second plurality of tiles, for example as described above with reference to FIG. 2A.

At 708, the computing system can generate an image object detection output by mapping the object detection data onto the image space of the image, for example as described above with reference to FIGS. 3 and 4. As discussed above, in some implementations, some of the bounding boxes of the image object detection output corresponding with partial object detections can be removed. Bounding boxes that intersect a border of the tiles within which the respective bounding box is defined can be identified and removed from the image object detection output.

Figure 8:
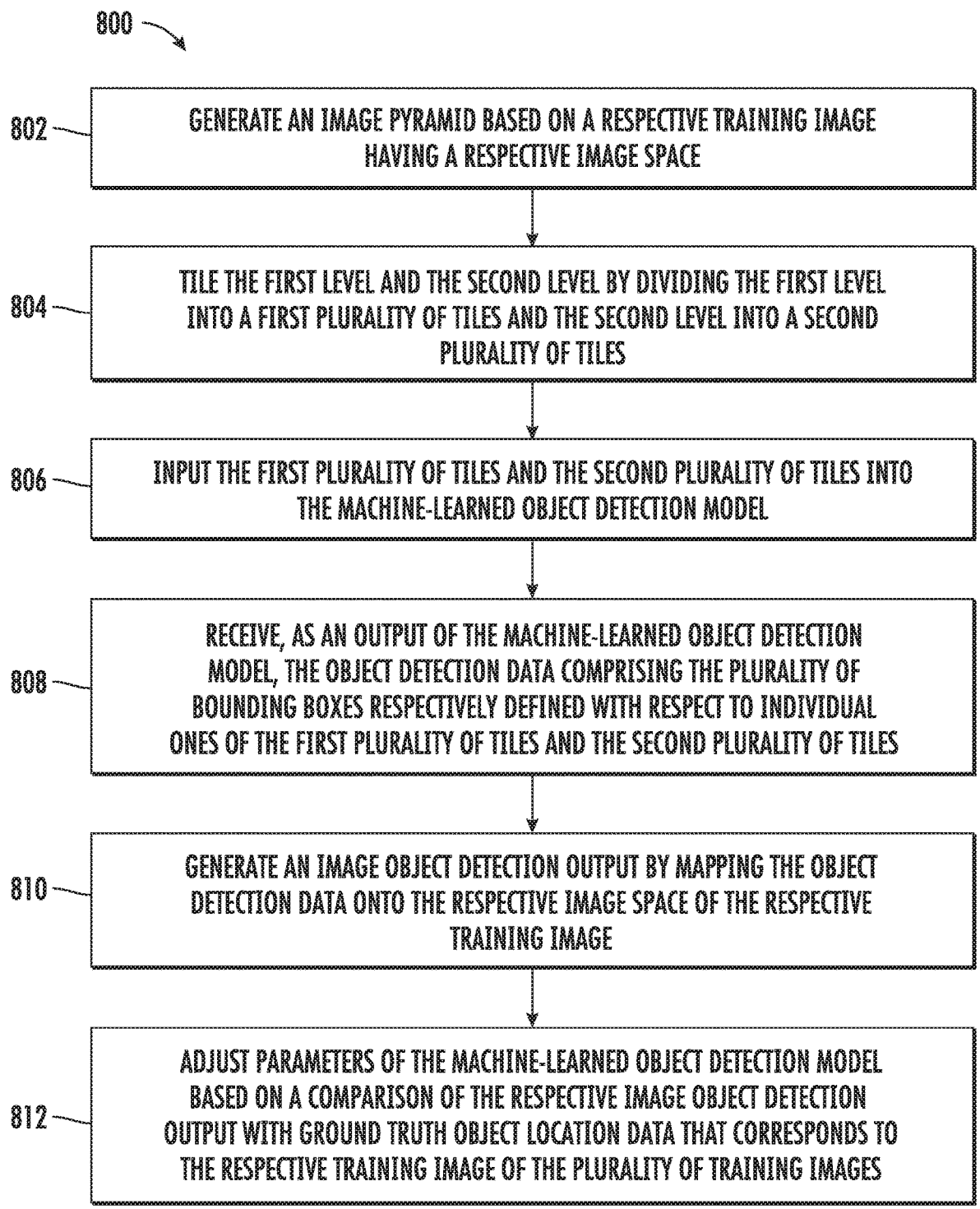
FIG. 8 depicts a flowchart of a method for training a machine-learned object detection model according to aspects of the present disclosure.

FIG. 8 depicts a flowchart of an example method 800 for training a machine-learned object detection model according to aspects of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

The method 800 can include performing each set of steps described below for each training image of a plurality of training images. More specifically, the method 800 can include, at (802), generating an image pyramid based on the respective training image having a respective image space. The image pyramid can include a first level corresponding with the respective training image at a first resolution and a second level corresponding with the respective training image at a second resolution that is different than the first resolution. The method 800 can include at (804), tiling the first level and the second level by dividing the first level into a first plurality of tiles and the second level into a second plurality of tiles. The method 800 can include at (806), inputting the first plurality of tiles and the second plurality of tiles into the machine-learned object detection model and, at (808), receiving object detection data as an output of the machine-learned object detection model. The object detection data can include the plurality of bounding boxes respectively defined with respect to individual ones of the first plurality of tiles and the second plurality of tiles. The method 800 can include, at (810), and generating an image object detection output by mapping the object detection data on the respective image space of the respective training image, for example as described above with reference to FIGS. 2A through 4.

The method 800 can also include, at (812), adjusting parameters of the machine-learned object detection model based on a comparison of the image object detection output with ground truth object location data that corresponds to the respective training image of the plurality of training images. For example, a loss function that describes this comparison can be evaluated. A gradient of the loss function can be calculated and the parameters of the machine-learned model can be adjusted, for example, through back propagation of errors through layers of the machine-learned object detection model.

As indicated above, in some implementations, the computing system can include a preliminary machine-learned model for example as described above with reference to FIG. 2B. In such implementations, parameters of the preliminary machine-learned model can be adjusted based on the comparison and/or loss function. Errors can be back propagated through each of the machine-learned model and preliminary machine-learned model. Parameters of one or both of the models can be adjusted. Thus, the models can be trained in an end-to-end fashion.

Additionally, in some implementations, the method 800 can also include removing bounding boxes of the image object detection output that correspond with partial object detections, for example as described above with reference to FIGS. 5A through 6.

It should be understood that various aspects of the present disclosure can be implemented during training, during inference or both. For instance, tiling can be used to train to the model as described above and/or during inference for example as described with reference to FIG. 7. However, tiling can be used during training alone or during inference alone. Similarly, redundant bounding boxes can be removed and/or partial detection boxes can be removed or "pruned" during training along, during inference along, or during both.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

Figure 9:
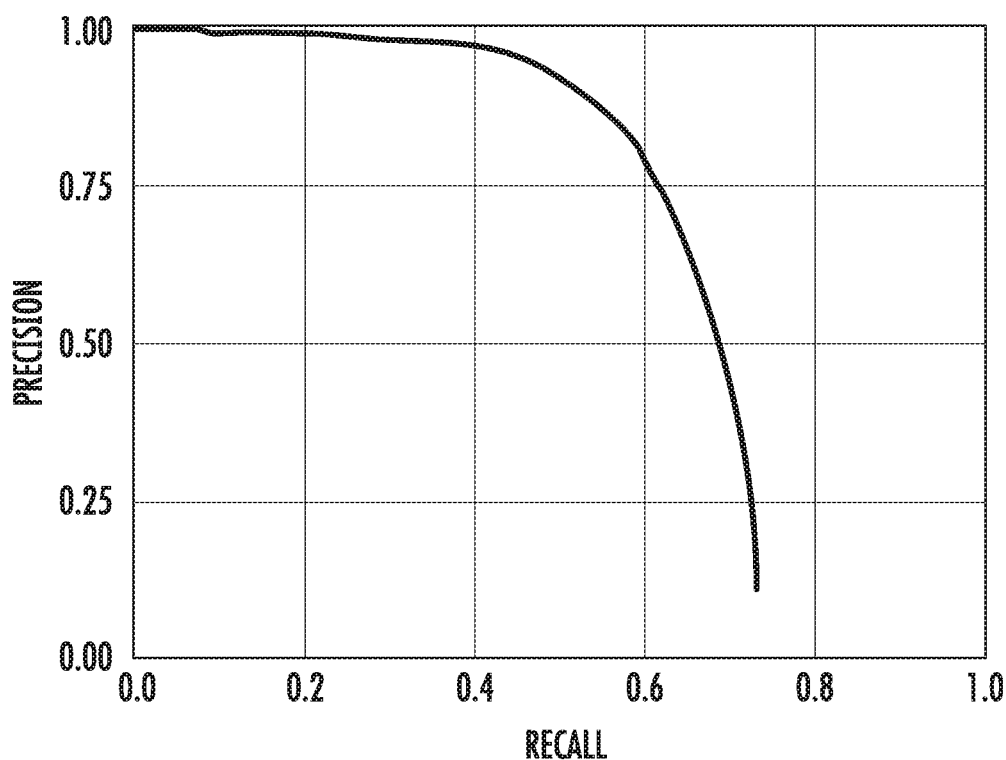
FIG. 9 depicts experimentally detected precision plotted against recall in which objects were recognized in images that were normalized to 1024×1024.

Referring to FIG. 9, objects were recognized in images that were normalized to 1024×1024. Precision is plotted against recall.

Figure 10:
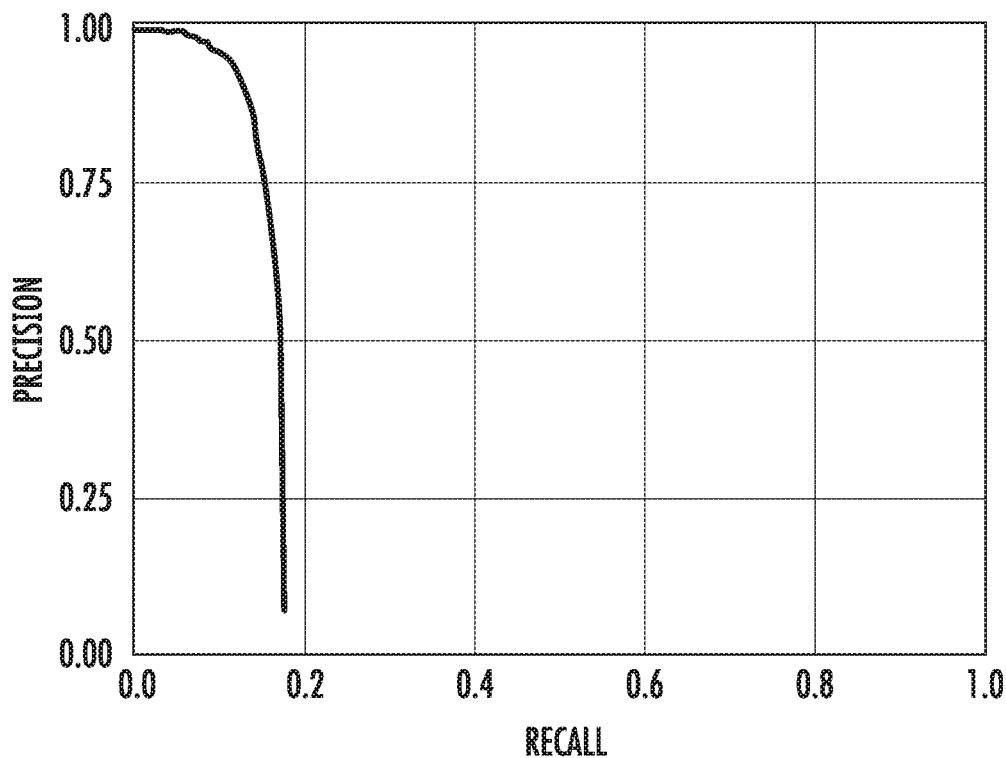
FIG. 10 depicts experimentally detected precision for a first data set plotted against recall in which training images were tiled to 256×256, input images were set to 529×529, and model was evaluated on test images of size 1024×2048 without tiling.
Figure 11:
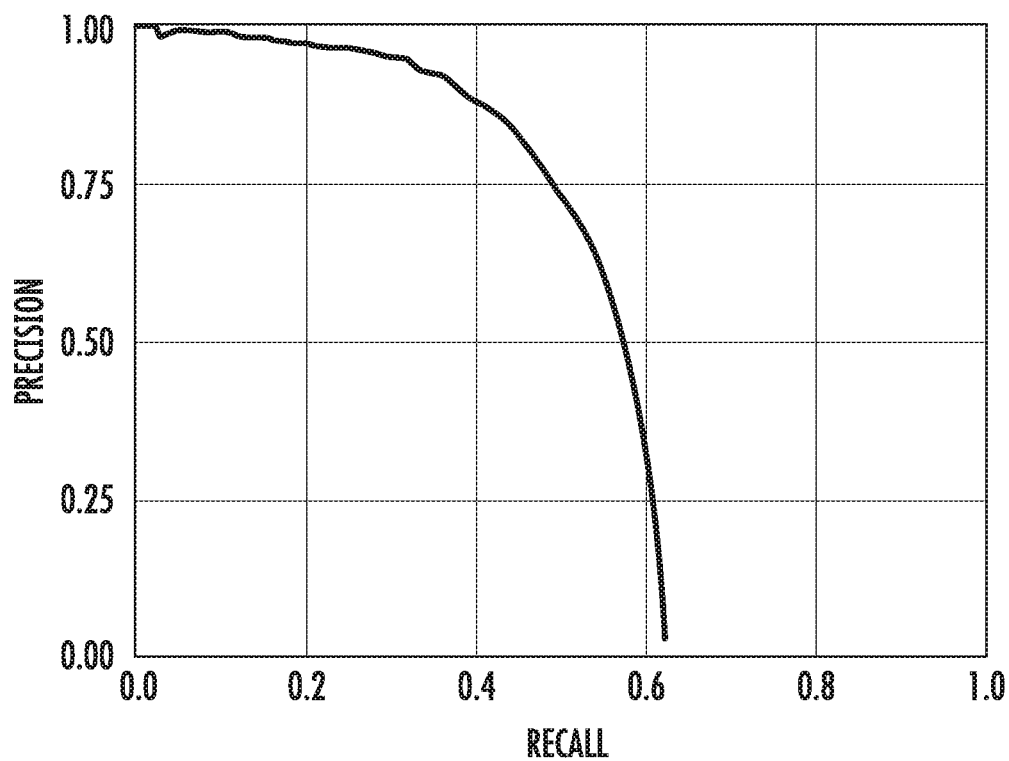
FIG. 11 depicts experimentally detected precision for a first data set plotted against recall in which training images were tiled to 256×256, input images were set to 529×529, the model was evaluated on test images of size 1024×2048 that were tiled, and redundant object recognition data was removed using non-maximal suppression.
Figure 12:
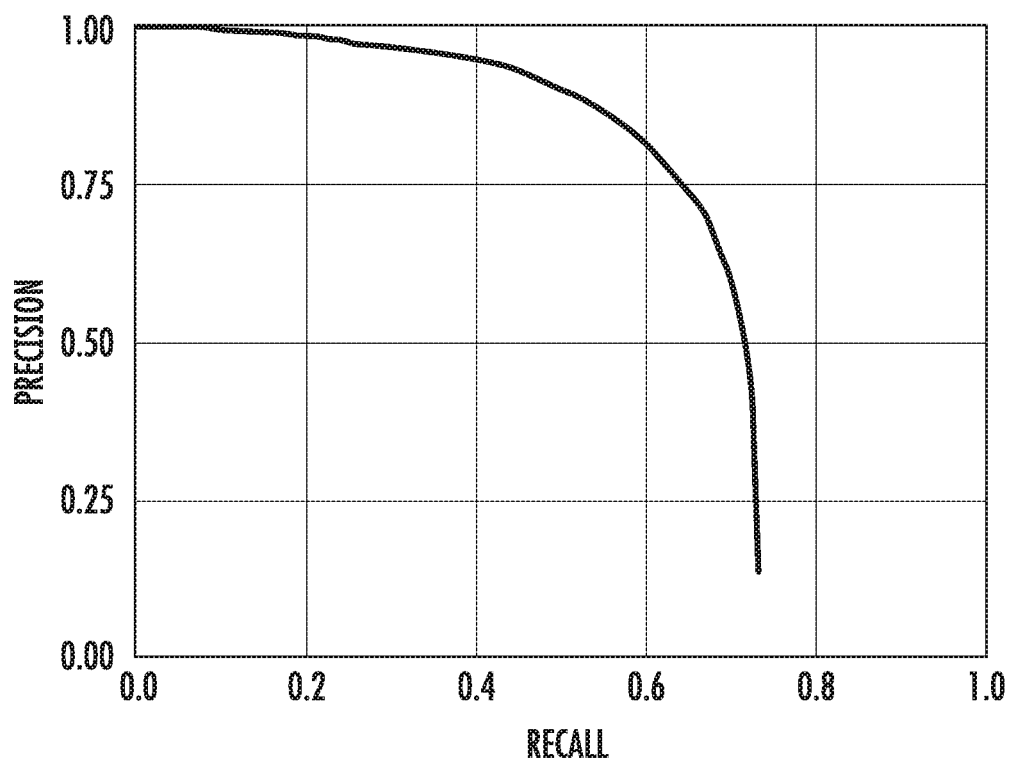
FIG. 12 depicts experimentally detected precision for a first data set plotted against recall in which redundant bounding boxes were removed using non-maximal suppression, partial detection bounding boxes were removed or "pruned," training images were tiled to 256×256, input images were set to 529×529, and the model was evaluated on test images of size 1024×2048 that were tiled.

FIGS. 10 through 12 illustrate experimentally collected data for a first data set including images of a city scape. Referring to FIG. 10, training images were tiled to 256×256, and input images were set to 529×529. The model was evaluated on test images of size 1024×2048 without tiling. Referring to FIG. 11, training images were tiled to 256×256, and input images were set to 529×529. The model was evaluated on test images of size 1024×2048 that were tiled. Redundant object recognition data was removed using non-maximal suppression. Referring to FIG. 12, redundant bounding boxes were removed using non-maximal suppression, and partial detection bounding boxes were removed or "pruned" as described herein. More specifically, training images were tiled to 256×256, and input images were set to 529×529. The model was evaluated on test images of size 1024×2048 that were tiled.

Figure 13:
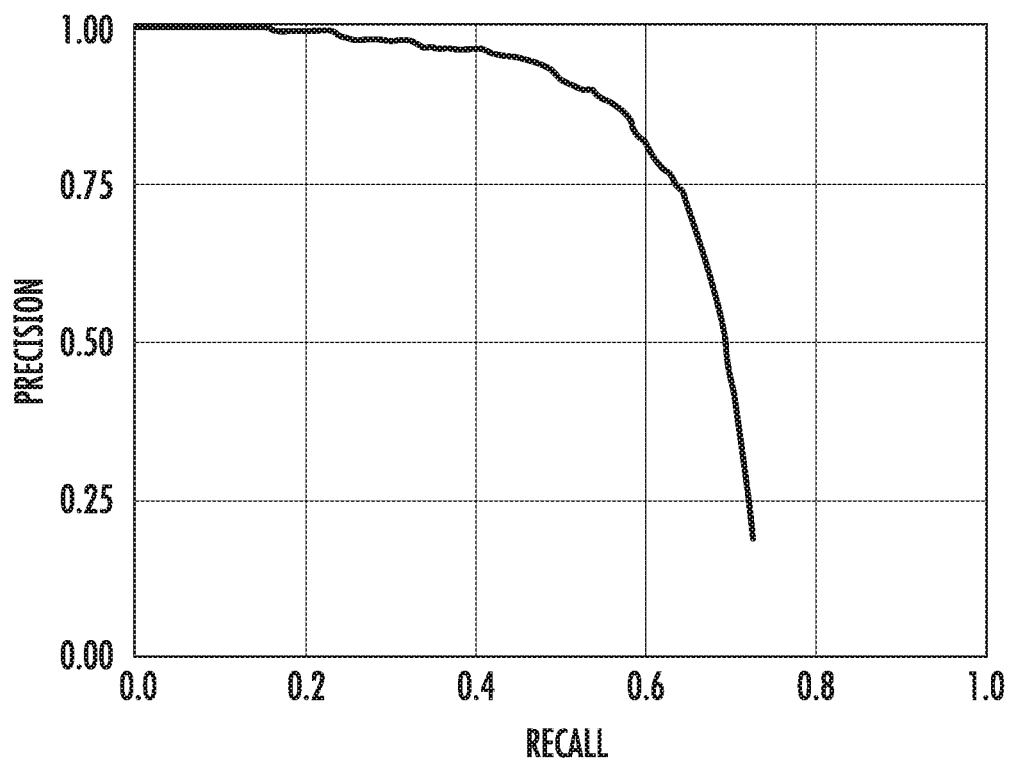
FIG. 13 depicts experimentally detected precision for a second data set plotted against recall in which an AutoML backend model was used, and input images were set to 1024×1024.
Figure 14:
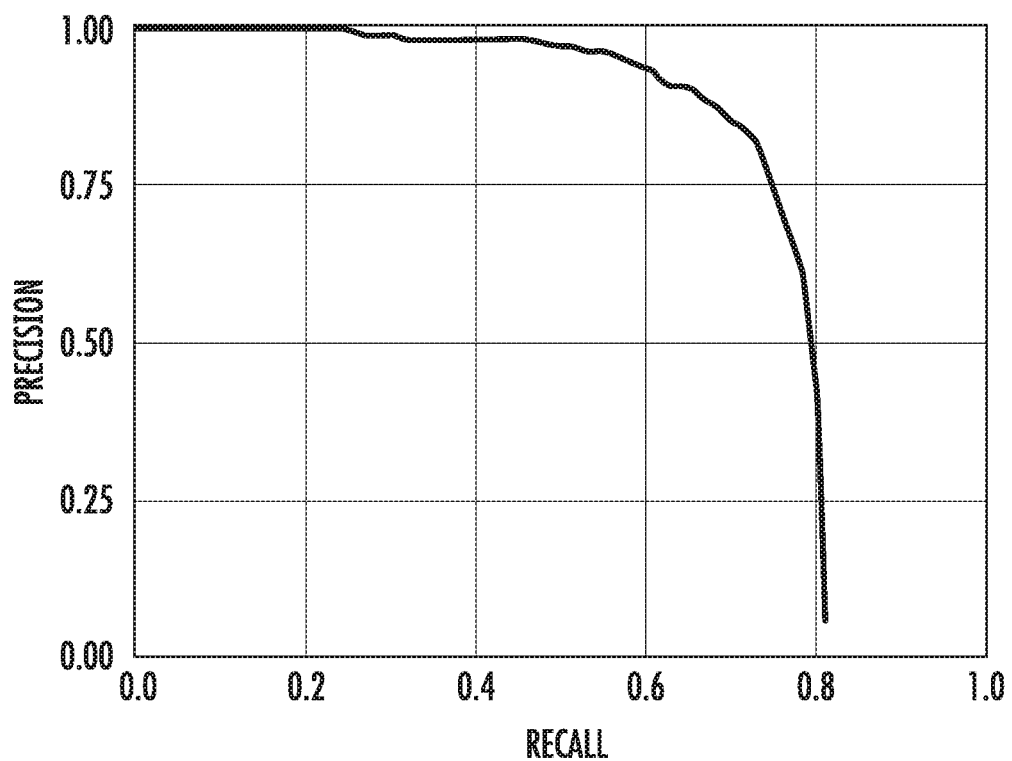
FIG. 14 depicts experimentally detected precision for a second data set plotted against recall in which an AutoML backend model was used, training images were tiled to 640×640, input images were set to 1024×1024, and redundant object recognition data was removed using non-maximal suppression.
Figure 15:
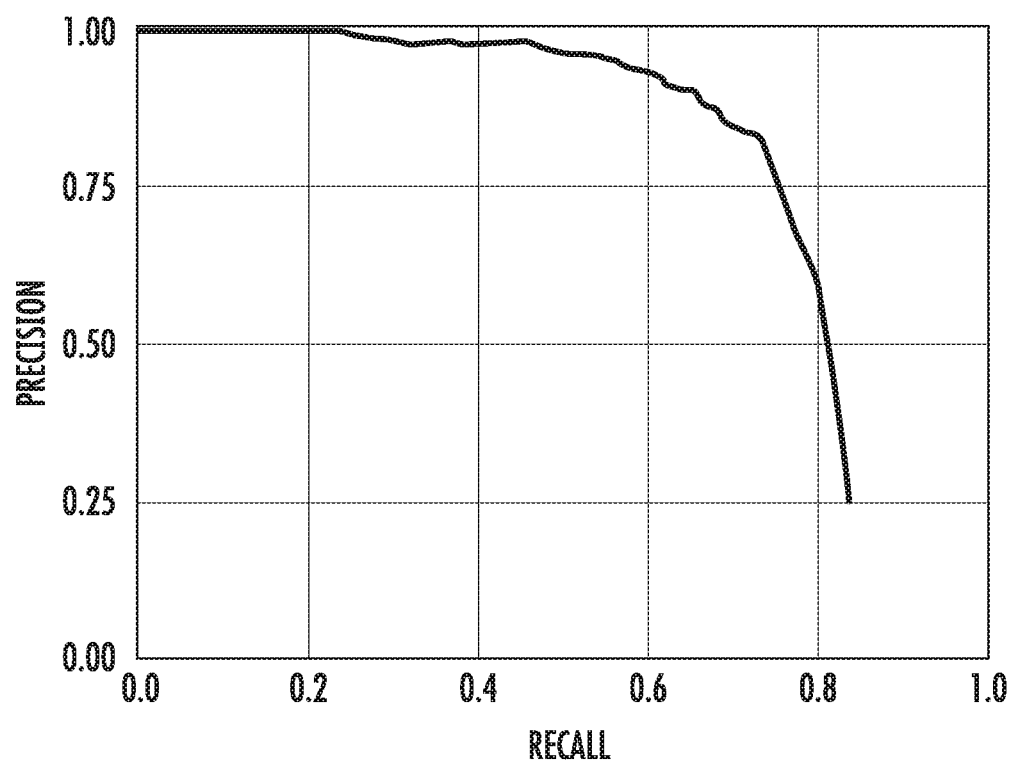
FIG. 15 depicts experimentally detected precision for a second data set plotted against recall in which an AutoML backend model was used, training images were tiled to 640×640, input images were set to 1024×1024, redundant object recognition data was removed using non-maximal suppression, and partial detection bounding boxes were also removed or "pruned."

FIGS. 13 through 15 illustrate experimentally collected data for a second data set. Referring to FIG. 13, an AutoML backend model was used. Input data was set to 1024×1024. Referring to FIG. 14, an AutoML backend model was used. Training images were tiled to 640×640, and input images were set to 1024×1024. Redundant object recognition data was removed using non-maximal suppression. Referring to FIG. 15, an AutoML backend model was used. Training images were tiled to 640×640, and input images were set to 1024×1024. Redundant object recognition data was removed using non-maximal suppression. Partial detection bounding boxes were also removed or "pruned" as described with respect to FIGS. 5A through 6.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
at least one processor;
a preliminary machine-learned object detection model configured to receive an image, and, in response to receipt of the image, output an intermediate feature representation;
a machine-learned object detection model configured to receive a plurality of tiles, and, in response to receipt of the plurality of tiles, output object detection data for the plurality of tiles, the object detection data comprising a plurality of bounding boxes respectively defined with respect to individual ones of the plurality of tiles; and
at least one tangible, non-transitory computer-readable medium that stores instructions that, when executed by the at least one processor, cause the at least one processor to perform operations, the operations comprising:
generating an image pyramid based on the image having an image space, the image pyramid comprising a first level corresponding with the image at a first resolution and a second level corresponding with the image at a second resolution that is different than the first resolution, wherein generating the image pyramid based on the image comprises:

inputting the image into the preliminary machine-learned object detection model, the image being input as a plurality of preliminary tiles;

receiving, as an output of the preliminary machine-learned object detection model, the intermediate feature representation, the intermediate feature representation corresponding with the plurality of preliminary tiles; and generating the first level and the second level of the image pyramid based on the intermediate feature representation;

tiling the first level and the second level by dividing the first level into a first plurality of tiles and the second level into a second plurality of tiles;

inputting the first plurality of tiles and the second plurality of tiles into the machine-learned object detection model;

receiving, as an output of the machine-learned object detection model, the object detection data comprising the plurality of bounding boxes respectively defined with respect to individual ones of the first plurality of tiles and the second plurality of tiles; and generating an image object detection output by mapping the object detection data onto the image space of the image.

2. The computing system of claim 1, wherein the operations further comprise:

identifying at least one bounding box of the image object detection output based on the at least one bounding box intersecting a border of one or more of the first plurality of tiles or second plurality of tiles; and removing the at least one bounding box from the image object detection output.

3. The computing system of claim 2, wherein the at least one bounding box is identified based on the at least one bounding box spanning across the one or more of the first plurality of tiles or the second plurality of tiles such that the at least one bounding box intersects the border and an opposite border of the one or more of the first plurality of tiles or the second plurality of tiles that is parallel with the border.

4. The computing system of claim 2, wherein the at least one bounding box is identified based on the at least one bounding box intersecting the border of the one or more of the first plurality of tiles or the second plurality of tiles and intersecting an edge of the respective level of the image pyramid.

5. The computing system of claim 2, wherein removing the at least bounding box from the image object detection output comprises removing each bounding box that intersects any of a plurality of borders of the first plurality of tiles or second plurality of tiles.

6. A method for training a machine learned object detection model, the method comprising:

for each training image of a plurality of training images:

generating, by one or more computing devices, an image pyramid based on the respective training image having a respective image space, the image pyramid comprising a first level corresponding with the respective training image at a first resolution and a second level corresponding with the respective training image at a second resolution that is different than the first resolution, wherein generating the image pyramid based on the training image comprises:

inputting the training image into a preliminary machine-learned object detection model, the training image being input as a plurality of preliminary tiles;

receiving, as an output of the preliminary machine-learned object detection model, an intermediate feature representation, the intermediate feature representation corresponding to the plurality of preliminary tiles; and generating the first level and the second level of the image pyramid based on the intermediate feature representation corresponding;

tiling, by the one or more computing devices, the first level and the second level by dividing the first level into a first plurality of tiles and the second level into a second plurality of tiles;

inputting, by the one or more computing devices, the first plurality of tiles and the second plurality of tiles into a machine-learned object detection model;

receiving, by the one or more computing devices and as an output of the machine-learned object detection model, object detection data comprising the plurality of bounding boxes respectively defined with respect to individual ones of the first plurality of tiles and the second plurality of tiles;

generating, by the one or more computing devices, an image object detection output by mapping the object detection data onto the respective image space of the respective training image; and adjusting, by the one or more computing devices, parameters of the machine-learned object detection model based on a comparison of the image object detection output with ground truth object location data that corresponds to the respective training image of the plurality of training images.

7. The method of claim 6, further comprising:

identifying, by the one or more computing devices, at least one bounding box of the image object detection output based on the at least one bounding box intersecting a border of one or more of the first plurality of tiles or second plurality of tiles; and removing, by the one or more computing devices, the at least bounding box from the image object detection output.

8. The method of claim 7, wherein the at least one bounding box is identified, by the one or more computing devices, based on the at least one bounding box spanning across the one or more of the first plurality of tiles or the second plurality of tiles such that the at least one bounding bod intersects the border and an opposite border of the one or more of the first plurality of tiles or the second plurality of tiles that is parallel with the border.

9. The method of claim 7, wherein the at least one bounding box is identified, by the one or more computing devices, based on the at least one bounding box intersecting the border of the one or more of the first plurality of tiles or the second plurality of tiles and intersecting an edge of the respective level of the image pyramid.

10. The method of claim 7, wherein removing, by the one or more computing devices, the at least bounding box from the image object detection output comprises removing, by the one or more computing devices, each bounding box that intersects any of a plurality of borders of the first plurality of tiles or second plurality of tiles.

11. The method of claim 6, wherein:

inputting the training image into the preliminary machine-learned object detection model comprises:

tiling the respective training image into the plurality of preliminary tiles;

inputting the plurality of preliminary tiles into the preliminary machine-learned object detection model that is configured to receive the plurality of preliminary tiles, and, in response to receipt of the plurality of preliminary tiles, output a plurality of intermediate feature representations that respectively correspond with the plurality of preliminary tiles;

generating the image pyramid comprises:

receiving, as an output of the preliminary machine-learned object detection model, the plurality of intermediate feature representations that respectively correspond with the plurality of preliminary tiles; and generating the first and second levels of the image pyramid based on the plurality of intermediate feature representations; and the method further comprises adjusting, by the one or more computing devices, parameters of the preliminary machine-learned object detection model based on the comparison of the respective image object detection output with ground truth object location data corresponding to the respective training image of the plurality of training images.

12. The method of claim 11, wherein the plurality of preliminary tiles correspond with a first preliminary level at the first resolution, and wherein generating the image pyramid based on the respective training image comprises downsizing the first preliminary level to generate a second preliminary level at the second resolution before tiling the first level and the second level.

13. A method for detecting locations of objects in images, the method comprising:

generating, by one or more computing devices, an image pyramid based on an image having an image space, the image pyramid comprising a first level corresponding with the image at a first resolution and a second level corresponding with the image at a second resolution that is different than the first resolution, wherein generating the image pyramid based on the image comprises:

inputting the image into the preliminary machine-learned object detection model, the image being input as a plurality of preliminary tiles;

receiving, as an output of the preliminary machine-learned object detection model, the intermediate feature representation, the intermediate feature representation corresponding with the plurality of preliminary tiles; and generating the first level and the second level of the image pyramid based on the intermediate feature representation;

tiling, by the one or more computing devices, the first level and the second level by dividing the first level into a first plurality of tiles and the second level into a second plurality of tiles;

inputting, by the one or more computing devices, the first plurality of tiles and the second plurality of tiles into the machine-learned object detection model;

receiving, by the one or more computing devices and as an output of the machine-learned object detection model, the object detection data comprising the plurality of bounding boxes respectively defined with respect to individual ones of the first plurality of tiles and the second plurality of tiles; and generating, by the one or more computing devices, an image object detection output by mapping the object detection data onto the image space of the image.

14. A computing system comprising:

at least one processor;

a machine-learned object detection model configured to receive a plurality of tiles, and, in response to receipt of the plurality of tiles, output object detection data for the plurality of tiles, the object detection data comprising a plurality of bounding boxes respectively defined with respect to individual ones of the plurality of tiles; and at least one tangible, non-transitory computer-readable medium that stores instructions that, when executed by the at least one processor, cause the at least one processor to perform operations, the operations comprising:

generating an image pyramid based on an image having an image space, the image pyramid comprising a first level corresponding with the image at a first resolution and a second level corresponding with the image at a second resolution that is different than the first resolution;

tiling the first level and the second level by dividing the first level into a first plurality of tiles and the second level into a second plurality of tiles;

inputting the first plurality of tiles and the second plurality of tiles into the machine-learned object detection model;

receiving, as an output of the machine-learned object detection model, the object detection data comprising the plurality of bounding boxes respectively defined with respect to individual ones of the first plurality of tiles and the second plurality of tiles;

generating an image object detection output by mapping the object detection data onto the image space of the image;

identifying at least one bounding box of the image object detection output based on the at least one bounding box intersecting a border of one or more of the first plurality of tiles or second plurality of tiles; and removing the at least one bounding box from the image object detection output;

wherein the at least one bounding box is identified based on the at least one bounding box intersecting the border of the one or more of the first plurality of tiles or the second plurality of tiles and intersecting an edge of the respective level of the image pyramid.

15. A computing system comprising:

at least one processor;

a preliminary machine-learned object detection model configured to receive a plurality of preliminary tiles, and, in response to receipt of the plurality of preliminary tiles, output a plurality of intermediate feature representations that respectively correspond with the plurality of preliminary tiles;

a machine-learned object detection model configured to receive a plurality of tiles, and, in response to receipt of the plurality of tiles, output object detection data for the plurality of tiles, the object detection data comprising a plurality of bounding boxes respectively defined with respect to individual ones of the plurality of tiles; and at least one tangible, non-transitory computer-readable medium that stores instructions that, when executed by the at least one processor, cause the at least one processor to perform operations, the operations comprising:

generating an image pyramid based on an image having an image space, the image pyramid comprising a first level corresponding with the image at a first resolution and a second level corresponding with the image at a second resolution that is different than the first resolution, wherein generating the image pyramid based on the image comprises:
   tiling the image into the plurality of preliminary tiles;
   inputting the plurality of preliminary tiles into the preliminary machine-learned object detection model;
   receiving, as an output of the preliminary machine-learned object detection model, the plurality of intermediate feature representations that respectively correspond with the plurality of preliminary tiles; and
   generating the first and second levels of the image pyramid based on the plurality of intermediate feature representations;
tiling the first level and the second level by dividing the first level into a first plurality of tiles and the second level into a second plurality of tiles;
inputting the first plurality of tiles and the second plurality of tiles into the machine-learned object detection model;
receiving, as an output of the machine-learned object detection model, the object detection data comprising the plurality of bounding boxes respectively defined with respect to individual ones of the first plurality of tiles and the second plurality of tiles; and
generating an image object detection output by mapping the object detection data onto the image space of the image.

16. The computing system of claim 15, wherein the plurality of preliminary tiles correspond with a first preliminary level at the first resolution, and wherein generating the image pyramid based on the image comprises downsizing the first preliminary level to generate a second preliminary level at the second resolution before tiling the first level and the second level.

\* \* \* \* \*